(12) United States Patent
Tsushima et al.

(10) Patent No.: US 9,718,688 B2
(45) Date of Patent: Aug. 1, 2017

(54) CARBON PLATE AND COMPOSITE CARBON PLATE

(71) Applicants: Nippon Steel & Sumikin Materials Co., Ltd., Tokyo (JP); Nippon Steel & Sumitomo Metal Corporation, Chiyoda-Ku, Tokyo (JP)

(72) Inventors: Eiki Tsushima, Hokkaido (JP); Shinkichi Murakami, Tokyo (JP); Jun Nakatsuka, Tokyo (JP); Kenichi Uemura, Tokyo (JP); Takashi Iijima, Tokyo (JP)

(73) Assignees: Nippon Steel & Sumikin Materials Co., Ltd., Tokyo (JP); Nippon Steel & Sumitomo Metal Corporation, Tokyo (JP)

( * ) Notice: Subject to any disclaimer, the term of this patent is extended or adjusted under 35 U.S.C. 154(b) by 36 days.

(21) Appl. No.: 14/779,129

(22) PCT Filed: Mar. 20, 2014

(86) PCT No.: PCT/JP2014/059058
§ 371 (c)(1),
(2) Date: Sep. 22, 2015

(87) PCT Pub. No.: WO2014/148649
PCT Pub. Date: Sep. 25, 2014

(65) Prior Publication Data
US 2016/0052787 A1    Feb. 25, 2016

(30) Foreign Application Priority Data

Mar. 22, 2013 (JP) .................. 2013-060824
Jun. 14, 2013 (JP) .................. 2013-125939

(51) Int. Cl.
*C01B 31/00* (2006.01)
*H01M 8/02* (2016.01)
(Continued)

(52) U.S. Cl.
CPC .............. *C01B 31/00* (2013.01); *C01B 31/04* (2013.01); *H01M 8/0213* (2013.01); *C01P 2006/40* (2013.01); *H01M 2008/1095* (2013.01)

(58) Field of Classification Search
None
See application file for complete search history.

(56) References Cited

U.S. PATENT DOCUMENTS 4,526,924 A * 7/1985 Korb .................. C08K 3/04
524/496
4,938,942 A * 7/1990 Gorman .............. C04B 35/83
264/29.5

(Continued)

FOREIGN PATENT DOCUMENTS

CN    101057356 A    10/2007
CN    101740743 A    6/2010

(Continued)

OTHER PUBLICATIONS

Int'l Search Report issued Jul. 1, 2014 in Int'l Application No. PCT/JP2014/059058.

(Continued)

*Primary Examiner* — David Sample
*Assistant Examiner* — Donald M Flores, Jr.
(74) *Attorney, Agent, or Firm* — Panitch Schwarze Belisario & Nadel LLP

(57) ABSTRACT

A thin-plate-like flexible carbon plate having flexibility, excellent compressive strength, and even electrical conductivity is provided. A carbon plate 1 is a carbon plate having (Continued)

a thickness of 0.05 to 2.0 mm obtained by compression molding of a mixture of (a) 97 to 80 wt % carbon powder composed of 95 to 30 wt % expanded graphite powder and 5 to 70 wt % graphite powder, and (b) 3 to 20 wt % phenolic resin that do not contain ammonia, wherein a compressive strength is 3 MPa or more, a bending strain is 0.6% or more without a crack, and a contact resistance is 6 m$\Omega \cdot cm^2$ or less.

10 Claims, 8 Drawing Sheets

(51) Int. Cl.
  *C01B 31/04* (2006.01)
  *H01M 8/0213* (2016.01)
  *H01M 8/1018* (2016.01)

(56) References Cited

U.S. PATENT DOCUMENTS

| | | | |
|---|---|---|---|
| 7,063,914 B2* | 6/2006 | Kawano | H01B 1/24 429/508 |
| 2002/0015876 A1* | 2/2002 | Saito | H01M 8/0221 429/454 |
| 2005/0104047 A1 | 5/2005 | Suzuki et al. | |
| 2008/0111112 A1 | 5/2008 | Tahara et al. | |

FOREIGN PATENT DOCUMENTS

| | | |
|---|---|---|
| JP | S5926907 A | 2/1984 |
| JP | S62223012 A | 10/1987 |
| JP | H10245491 A | 9/1998 |
| JP | 2000173630 A | 6/2000 |
| JP | 2000311695 A | 11/2000 |
| JP | 3715642 B2 | 11/2005 |
| JP | 2010123564 A | 6/2010 |
| WO | 2006049319 A1 | 5/2006 |

OTHER PUBLICATIONS

Written Opinion issued Jul. 1, 2014 in Int'l Application No. PCT/JP2014/059058 (EnglishTranslation).

Office Action issued Sep. 1, 2016 in CN Application No. 201480016666.4.

Extended European Search Report issued Oct. 31, 2016 in EP Application No. 14770238.5.

* cited by examiner

F I G. 3 (a)
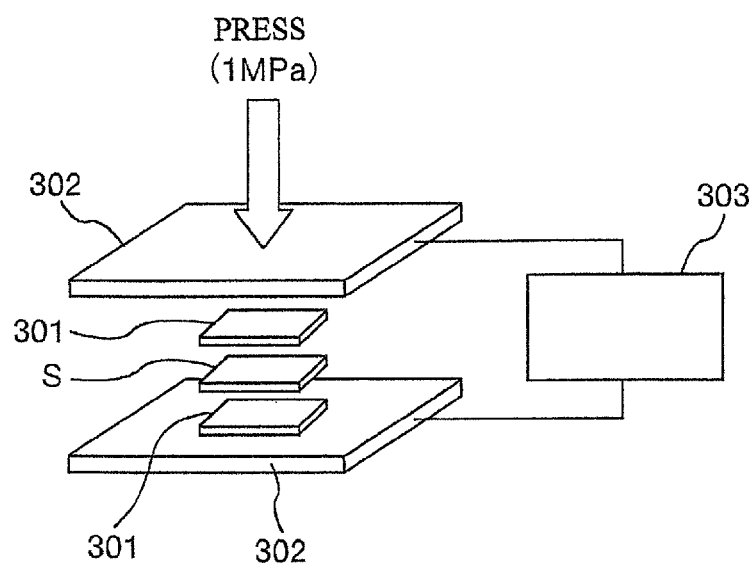
F I G. 3 (b)
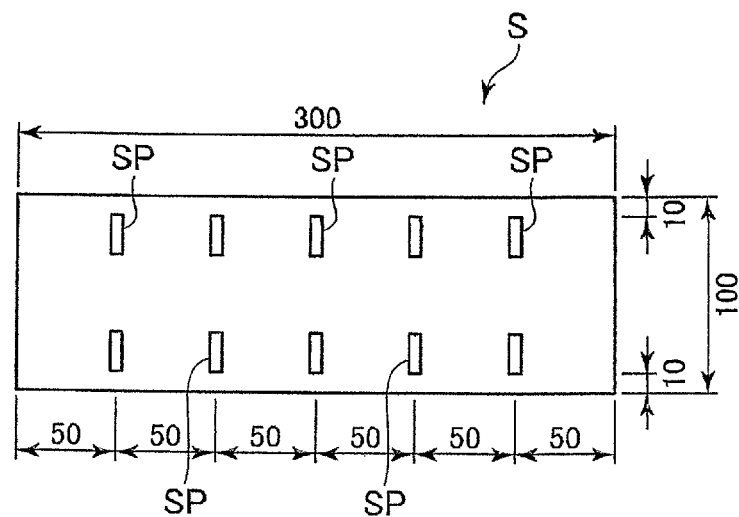

US 9,718,688 B2

CARBON PLATE AND COMPOSITE CARBON PLATE

CROSS-REFERENCE TO RELATED APPLICATION

This application is a Section 371 of International Application No. PCT/JP2014/059058, filed Mar. 20, 2014, which was published in the Japanese language on Sep. 25, 2014, under International Publication No. WO 2014/148649 A1, the disclosure of which is incorporated herein by reference.

TECHNICAL FIELD

The present invention relates to a graphite thin plate (hereinafter called "carbon plate) that is usable, for example, as a separator for a fuel cell used in a polymer electrolyte fuel cell or as a packing used for various devices, and that has flexibility, also has excellent compressive strength, and even has electrical conductivity, and the present invention further relates to a composite carbon plate having a carbon plate and a metal plate joined together and having increased gas impermeability and mechanical strength.

BACKGROUND ART

In recent years, a polymer electrolyte fuel cell has attracted attention as a power generator of an electric vehicle, for example. Examples of such a fuel cell and a separator for a fuel cell are shown in FIG. 7 and FIGS. 8(a) and 8(b).

FIG. 7 is an exploded view showing a configuration of a unit cell constituting a fuel cell 10, and FIG. 8 is a view showing a configuration of a separator 1 for the fuel cell shown in FIG. 7. FIG. 8(a) is a plan view, and FIG. 8(b) is a sectional view taken along line X-Y in FIG. 8(a).

The polymer electrolyte fuel cell 10 is configured such that several tens to several hundreds of MEAs (membrane electrode assemblies) having a solid polymer electrolyte membrane 6, an anode (fuel electrode) 7, and a cathode (oxidant electrode) 8 that are joined via a gasket 9 by two separators 1 for a fuel cell are provided side by side as unit cells, and such that electric current is extracted from an external circuit by supplying fuel gas (hydrogen gas), which is fluid, to the anode 7, and oxidizing gas (oxygen gas), which is fluid, to the cathode 8.

The separator 1 for a fuel cell, as shown in FIGS. 8(a), 8(b), has a shape having a plurality of grooves for gas supply and discharge 11 in one face or both faces of a thin-plate-like body, openings 12 for supplying the fuel gas or the oxidizing gas to the grooves for gas supply and discharge 11, and fixing holes 13 for providing the MEAs side by side, and the separator 1 for a fuel cell has a function of separating the fuel gas and the oxidizing gas flowing through the fuel cell so as to prevent them from mixing of these gases, and takes an important role of transmitting electric energy generated in the MEAs to the outside and radiating heat generated in the MEAs to the outside.

Therefore, properties required of the separator 1 for a fuel cell include having sufficient strength against fastening of a bolt during assembly or against vibration of an automobile or the like, reducing electrical resistance in order to reduce power generation loss, and gas impermeability for completely separating the fuel gas and the oxidizing gas in both of the faces and supplying them to the electrodes.

For such a separator 1 for a fuel cell, a carbon composite material using as a binder a thermosetting resin having advantages in production and cost has been suggested (for example, see patent literatures 1, 2, 3, etc.).

PRIOR ART DOCUMENT

Patent Literature

[Patent Literature 1]
Japanese Patent Application Publication No. Tokkai-Sho59-26907
[Patent Literature 2]
Japanese Patent Application Publication No. Tkkai2000-173630
[Patent Literature 3]
Publication of Japanese Patent No. 3715642

SUMMARY OF THE INVENTION

Problems to be Solved by the Invention

In particular, the above patent literatures 1, 2, 3 describe performing thermal compression molding or cold compression molding on a mixture of carbon powder and thermosetting resin by means of a press device, thereby manufacturing a separator for a fuel cell. Using graphite powder or expanded graphite powder as carbon powder is also disclosed. Further, the patent literature 3 describes using phenolic resin as thermosetting resin preferably on the ground of its good moldability or the like.

However, as a result of further research on and experiments with the separators for a fuel cell described in the above patent literatures, the present inventors have found the following problems.

Phenolic resin as thermosetting resin used for the separator for a fuel cell is chemically stable, flame-retardant, well compatible with carbon powder, such as graphite powder or expanded graphite powder, and, moreover, well resistant to acid, as compared with epoxy resin or the like, so that phenolic resin has many advantages, However, a thin-plate-like carbon plate having a thickness of about 0.05 to 2 mm, which is produced by using graphite powder as carbon powder and combining this graphite powder and phenolic resin integrally, is excellent in electrical conductivity and corrosion resistance, but too hard and fragile so that a crack occurs when the bending strain exceeds 0.6%, which results in a problem in flexibility. Thus, it has been found that in order to use this carbon plate as a separator for a fuel cell, for example, further improvement on formation of a stable water passage (groove) and on durability is required. On the other hand, a thin-plate-like carbon plate made of expanded graphite, which is produced by combining expanded graphite powder and phenolic resin integrally, has heat radiation and corrosion resistance properties, but this carbon plate is too soft, resulting in such a degree that the compressive strength is less than 3 MPa, and thus easily deform permanently. Therefore, this carbon plate has a difficulty in being used as a separator for a fuel cell, a packing, or the like.

Thus, it has been found that a conventional thin-plate-like carbon plate made of graphite needs further improvement on flexibility and compressive strength in order to use the carbon plate as a separator for a fuel cell or as a packing.

As a result of a lot of research and experiments, the present inventors have found that a thin-plate-like carbon plate made of graphite, which is produced by mixing expanded graphite powder and graphite powder in a specific ratio as carbon powder and performing compression molding on this carbon powder together with a specific amount of phenolic resin, in particular, phenolic resin not containing ammonia, has flexibility, compressive strength, and electrical conductivity that can sufficiently meet values required by a fuel cell, a packing, or the like.

That is, in order to produce a carbon plate having the above good properties, it is important to use phenolic resin that does not contain ammonia. Conventionally, ammonia is widely used as a polymerization medium in phenolic resin, and ammonia remains in the resin. However, as described later, in a case of phenolic resin containing ammonia, when the phenolic resin is held in warm water, bending strain performance degrades, and therefore flexibility and bending strain properties of a carbon plate using expanded graphite cannot be obtained.

Further, it has been also found that a composite carbon plate obtained by joining a carbon plate having the above good properties and a metal plate integrally has excellent gas impermeability, and mechanical strength, such as tensile strength, is also increased.

That is, an object of the present invention is to provide a thin-plate-like carbon plate having flexibility, also having excellent compressive strength, and even having electrical conductivity.

Another object of the present invention is to provide a composite carbon plate configured by joining the above carbon plate and a metal plate integrally, having excellent gas impermeability, and having increased mechanical strength, such as tensile strength.

Means for Solving the Problems

The above objects are achieved by a carbon plate and a composite carbon plate according to the present invention. In summary, a first present invention is a carbon plate having a thickness of 0.05 to 2.0 mm obtained by compression molding of a mixture of:

(a) 97 to 80 wt % carbon powder composed of 95 to 30 wt % expanded graphite powder and 5 to 70 wt % graphite powder; and (b) 3 to 20 wt % phenolic resin that does not contain ammonia, wherein a compressive strength is 3 MPa or more, a bending strain is 0.6% or more without a crack, and a contact resistance is 6 m$\Omega$·cm$^2$ or less.

According to an aspect of the first present invention, a maximum value of ten-point contact resistances is 6 m$\Omega$·cm$^2$ or less.

According to another aspect of the first present invention, the graphite powder is coated with the phenolic resin.

According to a second present invention, a composite carbon plate is provided, the composite carbon plate having a carbon plate integrally joined to at least one side of a metal plate having a thickness of 10 to 150 μm, wherein the carbon plate is a carbon plate having the above configuration.

According to an aspect of the second present invention, the metal plate is stainless steel, steel, aluminum, aluminum alloy, copper, copper alloy, nickel, nickel alloy, or the like.

Effects of the Invention

Since the thin-plate-like carbon plate according to the present invention has flexibility, also has excellent compressive strength, and even has electrical conductivity, the carbon plate can be effectively used as a separator for a fuel cell or as a packing of various devices. Further, the composite carbon plate of the present invention not only has properties of the above carbon plate, but also has excellent gas impermeability and the mechanical strength, such as tensile strength, increased, as compared with the carbon plate.

BRIEF DESCRIPTION OF THE DRAWINGS

FIG. 3(a) is a diagram for explaining a method of measuring a contact resistance, and FIG. 3(b) is a diagram for explaining measurement locations in a molded sample for measuring a maximum value of ten-point contact resistances;

EMBODIMENTS FOR CARRYING OUT THE INVENTION

Hereinafter, a carbon plate according to the invention will be further fully described with reference to the drawings.

First Embodiment

Figure 1:
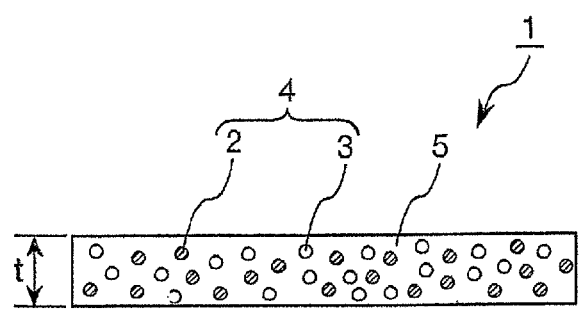
FIG. 1 is a schematic diagram explaining a configuration of an embodiment of a carbon plate according to the present invention.
Figure 8:
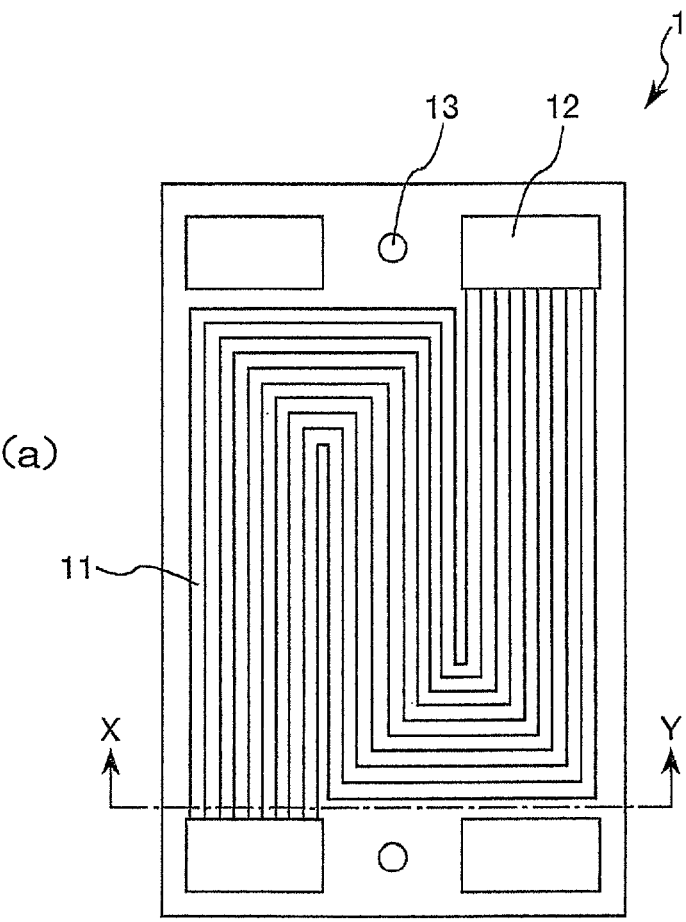
FIG. 8(a) is a plan view showing an example of a separator for a fuel cell, and FIG. 8 (b) is a sectional view taken along line X-Y in FIG. 8(a).
Figure 8:

First, with reference to FIG. 1, an entire configuration of an embodiment of a carbon plate 1 according to the present invention will be described. In this embodiment, the thin-plate-like carbon plate 1 made of graphite according to the present invention, for example, as described above, can be effectively used as a separator for a fuel cell, and is a thin-plate-like flat plate having a thickness (t) of 0.05 mm to 2.0 mm. In a case where the carbon plate is used as a separator for a fuel cell, for example, grooves 11 for water passage formation are formed by molding in a surface of the carbon plate 1, as shown in FIGS. 8(a) and 8(b).

According to the present invention, the carbon plate 1, which is a carbon composite, is formed by compression molding of a mixture of carbon powder 4 composed of expanded graphite powder 2 and graphite powder 3, and phenolic resin 5, as a binder, which does not contain ammonia, and, though the details will be described later with reference to experimental examples, the carbon plate 1 is a carbon plate having a compressive strength of 3 MPa or more, a bending strain of 0.6% or more without a crack, and a contact resistance of 6 m$\Omega\cdot$cm$^2$ or less.

Next, a configuration of the carbon plate 1 of the present invention will be further fully described.

(Carbon Powder)

The carbon powder 4 as an essential component for producing the carbon plate 1 of the present invention is composed of the expanded graphite powder 2 and the graphite powder 3, and a mixing ratio of the expanded graphite powder 2 to the graphite powder 3 is 95 to 30 wt % expanded graphite powder 2 to 5 to 70 wt % graphite powder 3. Outside this range, that is, if the graphite powder 3 exceeds 70 wt %, the carbon plate 1 obtained is too hard, the flexibility is impaired, and a crack occurs when the bending strain exceeds 0.6%. Therefore, in a case where the carbon plate 1 is used as a separator for a fuel cell, a problem with water passage (groove) formation, durability, or the like, arises. Further, if the expanded graphite powder 2 exceeds 95 wt %, the carbon plate 1 obtained is too soft, the compressive strength of the carbon plate 1 is less than 3 MPa, and permanent deformation easily occurs. Therefore, a problem with durability as a separator for a fuel cell or as a packing arises. It is preferred that the expanded graphite powder 2 be 30 to 60 wt %, and the graphite powder 3 be 70 to 40 wt %.

The expanded graphite powder 2 is obtained by heating scale-like natural graphite powder treated with acid, thereby expanding an interlayer of a graphite crystal by a factor of several hundreds, and it is preferred that expanded graphite powder 2 having an average particle size of 10 to 2000 µm be used. Further, the graphite powder 3 may be either natural graphite or synthetic graphite, and it is preferred that the graphite powder 3 having an average particle size of 10 µm to 400 µm and an aspect ratio of 2 or less be used.

(Phenolic Resin)

As described above, ammonia is conventionally widely used as a polymerization catalyst in phenolic resin, therefore ammonia remains in the resin. In a case of such phenolic resin containing ammonia, though fully described later, bending strain performance degrades when the phenolic resin is held in warm water, therefore the flexibility and bending strain properties of a carbon plate using expanded graphite cannot be obtained.

Therefore, as described above, in the present invention, phenolic resin, in particular, phenolic resin that does not contain ammonia is used as a binder for the carbon powder 4. Phenolic resin that does not contain ammonia does not use ammonia as a polymerization catalyst, but may use instead, for example, oxide of alkali metal or alkali earth metal, hydroxide, carbonate, or tertiary amine that does not generate ammonia, or the like. Using resol type phenolic resin, novolak type phenolic resin, or the like as phenolic resin provides good moldability. That is, phenolic resin, as described above, has good moldability, and is chemically stable, flame-retardant, well compatible with the carbon powder 4, such as expanded graphite powder 2 and graphite powder 3, and further, has good acid-resistance as compared with other thermosetting resins, such as epoxy resin, so that phenolic resin has many advantages. Further, in the present invention, since the phenolic resin does not contain ammonia, the compressive strength of the carbon plate 1 obtained is improved. In the following description relating to the present invention, for the sake of simple description, a simple term "phenolic resin" means "phenolic resin that does not contain ammonia," unless otherwise noted.

Powdery phenolic resin is preferably used as the phenolic resin. Liquid phenolic resin is extremely difficult to mix with carbon powder, in particular, the expanded graphite powder 2, and therefore it is difficult to obtain a uniform mixture. When powdery phenolic resin is used, it can be mixed with carbon powder in a predetermined weight ratio, and stirred sufficiently so that a homogeneous powdery raw mixture, that is, raw powder can be obtained.

It should be noted that a mixing ratio of a raw mixture is such that the carbon powder 4 composed of the expanded graphite powder 2 and the graphite powder 3 mixed in the above ratio is 97 to 80 wt %, and the phenolic resin 5 is 3 to 20 wt %. Outside this range, that is, if the phenolic resin 5 exceeds 20 wt %, the flexibility of the carbon plate 1 obtained is impaired, and a crack occurs when the bending strain exceeds 0.6%. Further, the contact resistance increases and largely exceeds 6 m$\Omega\cdot$cm$^2$, therefore a problem arises when the carbon plate 1 is used as a separator for a fuel cell. Further, if the phenolic resin 5 is less than 3 wt %, the compressive strength of the carbon plate 1 obtained lowers, and a crack occurs when the bending strain exceeds 0.6%. Therefore, a problem arises when the carbon plate 1 is used as a separator for a fuel cell, a packing, or the like. It is preferred that the carbon powder 4 be 95 to 85 wt %, and the phenolic resin 5 be 5 to 15 wt %.

It should be noted that, in addition to the carbon powder 4 and the phenolic resin 5, a fiber substrate, filler, mold release agent, hydrolysis-resistant agent, or the like may be added to the above raw mixture, if necessary.

In addition, according to the present invention, the phenolic resin 5 is blended with the carbon powder 4 composed of the expanded graphite powder 2 and the graphite powder 3 in a predetermined ratio, but it is also possible to preliminarily cover (that is, perform coating) at the graphite powder 3 with the phenolic resin 5 in the above ratio. Coating graphite powder with phenolic resin in this manner improves uniform dispersibility of phenolic resin in a raw mixture, therefore segregation of phenolic resin in the carbon plate 1 obtained is prevented, and a contact resistance and a maximum value of ten-point contact resistances can be kept at 6 m$\Omega\cdot$cm$^2$ or less. A covering method is not limited to a particular one, but solution coating, spray coating, reaction coating, melting coating, or the like, which is generally-adopted, can be adopted.

(Method of Manufacturing Carbon plate)

Next, a method of manufacturing a carbon plate 1 according to the present invention will be described. The carbon plate 1 of the present invention can be manufactured by various molding methods, and an exemplary molding method will be described below.

Specific Example 1-1

Figure 2:
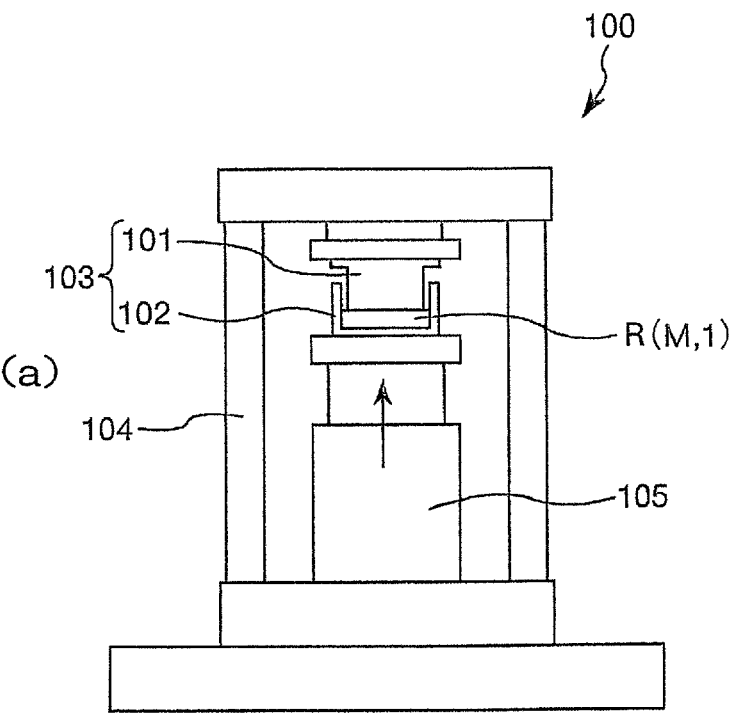
FIG. 2(a) is a schematic diagram showing a configuration of a press device used for a thermal compression molding process or a cold compression molding process.
FIG. 2(b) is a schematic diagram showing a configuration of a heating device used for a resin hardening process.
Figure 2:
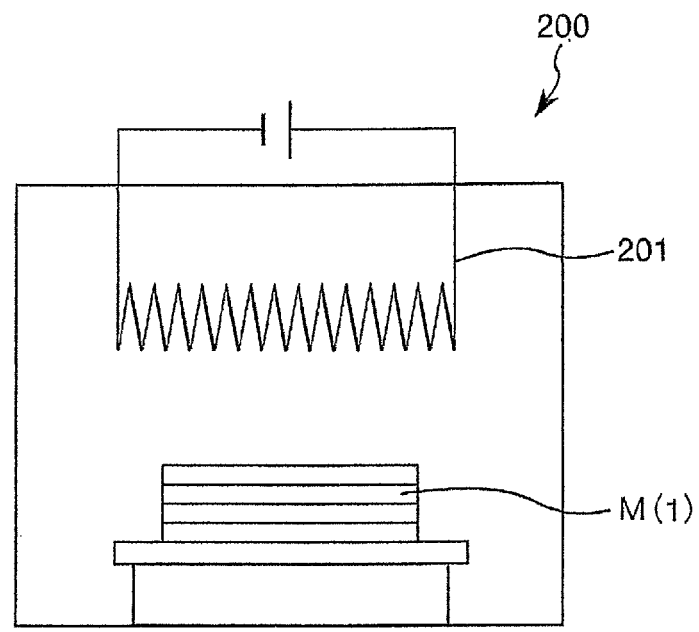

The carbon plate 1 of the present invention can be manufactured by thermal compression molding of a raw mixture. FIG. 2 shows an example of a press device 100 for thermal compression molding for manufacturing the carbon plate 1 of the present invention.

In this specific example 1-1, the press device 100 is a uniaxial thermal compression molding device, and has a mold 103 composed of a male mold 101 and a female mold 102 in a pair, and the male mold 101 is fixed to a machine frame 104. The female mold 102 is disposed below and opposite the male mold 101, and can be raised and lowered by a hydraulic cylinder 105. It should be noted that, in the press device 100 in the specific example 1-1, the mold 103 has a heater (not shown) fitted inside.

A raw mixture R prepared in such a blending ratio as described above is put into the mold 103 and molded by thermal compression in the press device 100 so as to have a thickness of 0.05 to 2.0 mm after molding, the resin is hardened, and the carbon plate 1 can be thus obtained. In this process, a predetermined pattern, for example, a groove pattern 11 of a separator (see FIGS. 8(*a*) and 8(*b*)) is preliminarily formed in pressing faces of the male mold 101 and the female mold 102 so that the groove 11 for gas supply and discharge is formed in an inverted manner in a molded plate M.

It should be noted that heating temperature is set at 130 to 200° C. that is equal to or higher than the curing temperature of the phenolic resin 5, and that molding pressure is set at 3 to 30 MPa, and molding time is set at 3 to 30 minutes. A vacuum press may be used.

Specific Example 1-2

The carbon plate 1 of the present invention can be manufactured by molding the raw mixture R by cold compression first, and then hardening the molded plate M by heating. Therefore, in this specific example 1-2, the press device 100 performing compression molding on the raw mixture R is a uniaxial compression molding device that is not equipped with a heater which the uniaxial thermal compression molding device used in the above specific example 1-1 is equipped with. The rest of the configuration of the press device 100 in the specific example 1-2 is the same as that in the specific example 1-1. That is, the press device 100 in the specific example 1-2 has a mold 103 composed of a male mold 101 and a female mold 102 in a pair, and the male mold 101 is fixed to a machine frame 104. The female mold 102 is disposed below and opposite the male mold 101, and can be raised and lowered by a hydraulic cylinder 105. In this specific example 1-2, since the press device 100 is not equipped with a heater, a heating device 200 equipped with a heater 201 is separately disposed, as shown in FIG. 2(*b*).

In this manner, in this specific example 1-2, a molded plate M the resin of which is still not hardened is formed by cold compression molding where the raw mixture R in the mold 103 is pressurized by the press device 100 into a predetermined shape, and the molded plate M manufactured by this compression molding is heated in the heating device 200, such as an oven, so that the resin of the molded plate M is hardened, and the carbon plate 1 is thus manufactured.

More specifically, in this specific example 1-2, in the cold compression molding process performed by the press device 100, the female mold 102 is evenly filled with the raw mixture R, and the female mold 102 is pressed against the male mold 101 by the hydraulic cylinder 105 such that the female mold 102 and the male mold 101 apply a pressure of 30 MPa or more on the raw mixture R, and the molded plate M having a separator shape is thus compressively molded. In this process, since the predetermined groove pattern 11 is preliminarily formed in the pressing faces of the female mold 102 and the male mold 101, the groove 11 for gas supply and discharge is formed in an inverted manner in the molded plate M.

Further, in this specific example 1-2, since cold compression molding performed at room temperature without heating is adopted in the compression molding process, and it is unnecessary to heat the raw mixture R, the molding time can be shortened, so that one molded plate M can be produced by compression molding in five to ten seconds. Further, since the resin is not hardened, adhesion between the mold and the product does not occur, so that the mold releasability is excellent. Since processing into a desired shape can be completed only by this cold compression molding, the productivity is excellent.

Since a pressure of 30 MPa or more is caused to act on the raw mixture R when cold compression molding is performed by the press device 100, a dense molded plate M having a separator shape can be obtained, so that the separator 1 for a fuel cell having both mass productivity and high performance can be manufactured.

In a resin hardening process, the molded plate M released from the mold 103 is brought into such a heating device 200 as shown in FIG. 2(*b*), and heated at 130 to 200° C., which is equal to or higher than the resin curing temperature of the phenolic resin 5, in a pressureless state by a heating means 201, such as an electric heater, so that the phenolic resin 5 is hardened, and the separator 1 for a fuel cell can be thus manufactured. It should be noted that in the resin hardening process, a lot of molded plates M may be brought into a batch type furnace and heated, or the molded plates M may be heated on a belt conveyer in a continuous furnace. Though requiring a long time for heating, both the systems can treat a large number of molded plates M, and accordingly the total manufacturing time is reduced.

Experimental Example and Comparative Example

Next, experimental examples and comparative examples of the present invention will be described in order to demonstrate the performance of the carbon plate 1 of the present invention.

It should be noted that, in experimental examples 1 to 7 and comparative examples 1 to 7 of the present invention, molded samples S having a thickness of 0.2 mm (or 1.8 mm) and being 300 mm in length×200 mm in width were manufactured as carbon plates. Further, the molded samples S of the experimental examples 1 to 7 and the comparative examples 1 to 7 were manufactured based on a thermal compression molding method using the press device 100 described in the above specific example 1-1.

Regarding each experimental example and each comparative example, a compressive strength, bending strength (bending strain), and electrical resistance (contact resistance) were measured and compared, and methods of measuring the compressive strength, bending strain, and contact resistance are as follows:

Compressive Strength
- A test material of 100 mm square obtained by processing the molded sample S was placed on an iron plate of 10 mm or more in thickness, and this test material was pressed with different stresses (3 MPa, 5 MPa, 10 Ma) using an iron core of 10 mm in diameter, then whether or not an impression was produced was visually confirmed.

O: a case where an impression did not remain
X: a case where an impression remained Bending Strength (1)
- A test material of 100 mm in width and 100 mm in length obtained by processing the molded sample S was wound around an iron bar of 30 mm in diameter, then whether or not 0.67% bending strain (0.67% strain) caused a crack in the surface was observed.

O: a case where 0.67% strain did not cause a crack
X: a case where 0.67% strain caused a crack Bending Strain (2)
- When being held in warm water, phenolic resin containing ammonia may be cracked by 0.6% bending strain (0.6% strain). Therefore, a test material of 100 mm in width and 100 mm in length obtained by processing the molded sample S was immersed in 90° C. hot water for 100 hours, and thereafter wounded around an iron bar of 30 mm in diameter, and then whether or not 0.67% strain caused a crack in the surface was observed.
O: a case where 0.67% strain did not cause a crack
X: a case where 0.67% strain caused a crack
Contact Resistance
A method of measuring a contact resistance is shown in FIG. 3(a). A test material was produced by processing the molded sample S so as to have a length of 17 to 20 mm and a width of 3 to 5 mm. The test material S was held between pieces of carbon paper (Toray Industries, Inc.: Product Name "TGP-H-120") 301, and further, held between toper electrodes 302, and then a contact resistance was measured with a compression stress of 1 MPa added by a universal tester (SHIMADZU CORPORATION: Product Name "EZ-L"). A low resistance meter (TSURUGA ELECTRIC CORPORATION: Product Name "Model 3569") was used as a measuring device 303, and a 4-terminal method was used for the measurement.

Further, in the present invention, a raw mixture can be prepared by blending powdery carbon powder 4 (expanded graphite powder 2 and graphite powder 3) and powdery phenolic resin 5, and, in this case, due to dispersibility of phenolic resin in the raw mixture, the phenolic resin may segregate in the carbon plate 1 obtained, and accordingly the contact resistance of the carbon plate 1 may partially increase. Therefore, a maximum value of ten-point contact resistances with respect to the molded sample S was measured by the same method as the contact resistance measuring method described with reference to FIG. 3(a). However, in that case, the molded sample S was 300 mm in length and 100 mm in width, and, as shown in FIG. 3(b), the measurement was performed at ten-point measurement locations SP set at intervals of 50 mm in two rows in the longitudinal direction, and a maximum value in the measurement was treated as a maximum value of ten-point contact resistances.

Table 1 shows blending ratios of raw powder used in the experimental examples and the comparative examples of the present invention, measurement results, and acceptance and rejection judgment results.

TABLE 1

| No. | | Graphite amount (wt %) Expanded graphite | Graphite | Total | Phenolic resin amount wt % | Phenolic resin type Presence/ absence of ammonia | Resin blending method | Thickness mm | Compressive strength MPa 3 | 5 | 10 | Bending strength (1) 0.67% strain | Bending strength (2) 0.67% strain | Contact resistance; $m\Omega \cdot cm^2$ | Maximum value of ten-point contact resistances $m\Omega \cdot cm^2$ |
|---|---|---|---|---|---|---|---|---|---|---|---|---|---|---|---|
| | Claimed range | 30-95 | 70-5 | 100 | 3-20 | Not contained | Coating graphite | 0.05-2.0 | O | | | O | O | ≤6 | ≤6 |
| 1 | Experimental example | 30 | 70 | 100 | 9 | Not contained | Coating graphite | 0.2 | O | O | O | O | O | 5.0 | 5.2 |
| 2 | | 55 | 45 | 100 | 9 | Not contained | Coating graphite | 0.2 | O | O | O | O | O | 3.2 | 3.5 |
| 3 | | 55 | 45 | 100 | 9 | Not contained | Coating graphite | 1.8 | O | X | X | O | O | 3.2 | 3.3 |
| 4 | | 90 | 10 | 100 | 9 | Not contained | Coating graphite | 0.2 | O | X | X | O | O | 3.0 | 3.4 |
| 5 | | 35 | 65 | 100 | 9 | Not contained | Coating graphite | 0.2 | O | O | O | O | O | 5.5 | 5.7 |
| 6 | | 30 | 70 | 100 | 18 | Not contained | Coating graphite | 0.2 | O | O | O | O | O | 5.8 | 6.0 |
| 7 | | 30 | 70 | 100 | 9 | Not contained | Blended in powdery form | 0.2 | O | O | O | O | O | 5.2 | 6.7 |
| 1 | Comparative example | 96 | 4 | 100 | 9 | Not contained | Coating graphite | 0.2 | X | X | X | O | O | 2.8 | 3.2 |
| 2 | | 25 | 75 | 100 | 9 | Not contained | Coating graphite | 0.2 | O | O | O | X | | 5.0 | 5.2 |
| 3 | | 55 | 45 | 100 | 2 | Not contained | Coating graphite | 0.2 | O | X | X | X | | 2.5 | 2.8 |
| 4 | | 55 | 45 | 100 | 35 | Not contained | Coating graphite | 0.2 | O | O | O | X | | 12.0 | 12.4 |
| 5 | | | 100 | 100 | 9 | Not contained | Coating graphite | 0.2 | O | O | O | X | | 7.0 | 7.3 |
| 6 | | 30 | 70 | 100 | 25 | Not contained | Coating graphite | 0.2 | O | O | O | X | O | 7.2 | 7.5 |
| 7 | | 30 | 70 | 100 | 9 | Contained | Coating graphite | 0.2 | O | O | O | O | X | 5.3 | 5.5 |

(Compressive strength);
O: a case where an impression did not remain;
X: a case where an impression remained
(Bending strength (1));
O: a case where 0.67% strain did not cause a crack;
X: a case where 0.67% strain caused a crack
(Bending strength (2));
after immersion in 90° C. hot water for 100 hours;
O: a case where 0.67% strain did not cause a crack,;
X: a case where 0.67% strain caused a crack (1) In the above experimental examples 1 to 7 and the comparative examples 1 to 4, 6, 7, the expanded graphite powder 2 and the graphite powder 3 were used as the carbon powder 4. In the comparative example 5, only the graphite powder 3 was used as the carbon powder 4, and the expanded powder 2 was not used. Graphite powder having an average particle size of 20 μm and a particle aspect ratio of 1.5 was used as the graphite powder 3.

Phenolic resin that did not contain ammonia was used as the phenolic resin 5, except for the comparative example 7. Further, except for the comparative example 7, the phenolic resin 5 was used in a state of coating the graphite powder 3, but, in the comparative example 7, the powdery phenolic resin 5 was used in the state of being mixed in the carbon powder 4.

The carbon powder 4, that is, the expanded graphite powder 2 and the graphite powder 3, and the phenolic resin 5 were sufficiently mixed into a raw mixture (mixed powder) in various mixing ratios (wt %), as shown in Table 1. 20 g of the mixed powder (the experimental examples and the comparative examples, except for the experimental example 3) or 180 g thereof (the experimental example 3) were evenly put into the female mold 102 having a volume of 300×200×20 nm of the press device 100. Heating temperature was 150° C., molding pressure was 5 MPa, and molding time was ten minutes.

It should be noted that, conventionally, physical properties required for a separator for a fuel cell are as follows:
Compressive strength: 3 MPa or more
Bending Strength: No crack with 0.6% strain
Contact Resistance: 5 mΩ·cm$^2$ or less
Evaluation of the Experimental Examples and the Comparative Examples With reference to the experimental examples 1 to 7, it can be seen that the carbon plate 1 configured according to the present invention, that is, the carbon plate 1 of 0.05 to 2.0 mm in thickness obtained by compression molding of a mixture of:
(a) 97 to 80 wt % carbon powder composed of 95 to 30 wt % expanded graphite powder and 5 to 70 wt % graphite powder; and
(b) 3 to 20 wt % phenolic resin that does not contain ammonia is a carbon, plate having a compressive strength of 3 MPa or more, having no crack with 0.6% or more bending strain, and having a contact resistance of 6 mΩ·cm$^2$ or less.

That is, it can be seen that the carbon plate 1 according to the present invention has excellent flexibility, as compared with a carbon plate shown in the comparative example 5 and formed by combining the graphite powder integrally with the phenolic resin that does not contain ammonia, and has extremely effective physical property values as a separator for a fuel cell or as a packing.

Further, it can be seen that, in the carbon plate 1 according to the present invention, a mixing ratio of the expanded graphite powder 2 to the graphite powder 3 is 95-30 wt % expanded graphite powder 2 to 5-70 wt % graphite powder 3, but, outside this range, that is, if the graphite powder 3 exceeds 70 wt %, the carbon plate 1 obtained is too hard, the flexibility is impaired, and a crack occurs when the bending strain exceeds 0.6% (comparative example 2). It can also be seen that, if the expanded graphite powder 2 exceeds 95 wt %, the carbon plate 1 obtained is too soft, the compressive strength of the carbon plate 1 is less than 3 MPa, and permanent deformation easily occurs (comparative example 1). Therefore, a problem with durability as a separator for a fuel cell or a packing arises. It is preferred that the expanded graphite powder 2 be 30 to 60 wt %, and the graphite powder 3 be 70 to 40 wt % (experimental examples 1 to 3, 5 to 7).

Further, it can be seen that, in the carbon plate 1 of the present invention, a mixing ratio of the phenolic resin 5 that does not contain ammonia is set at 3 to 20 wt % with respect to 97 to 80 wt % carbon powder composed of the expanded graphite powder 2 and the graphite powder 3, but, outside this range, that is, if the phenolic resin 5 exceeds 20 wt %, the electrical conductivity of the carbon plate 1 obtained lowers (comparative examples 4, 6), or, if the phenolic resin 5 is less than 3 wt %, the compressive strength of the carbon plate 1 obtained significantly lowers (comparative example 3), therefore the carbon plate has a problem as a separator for a fuel cell.

(2) Though using a raw mixture having the same composition as the experimental example 1, the experimental example 7, as described above, is a carbon plate using the powdery phenolic resin 5 in a state of being mixed with the carbon powder 4. In this example, it can be seen that, since the powdery phenolic resin was used, the dispersibility of the phenolic resin in the raw powder mixture lowered, and consequently the phenolic resin in the carbon plate obtained segregated, the maximum value of ten-point contact resistances exceeded 6 mΩ·cm$^2$, and the contact resistance partially increased.

The comparative example 7 used the phenolic resin 5 coating the graphite powder 3, as in the case of the experimental example 1, and used a raw mixture having the same composition as the experimental example 1, but the phenolic resin containing ammonia was used. Therefore, it can be seen that the comparative example 7 had a lower bending strength (2) than the experimental example 1.

Second Embodiment

Figure 4:
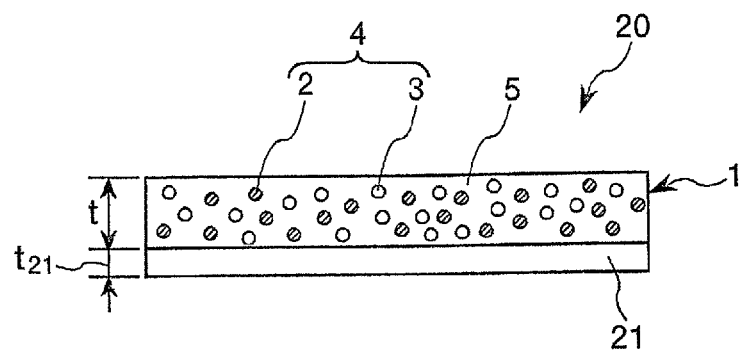
FIGS. 4(a) and 4(b) are schematic diagrams for explaining configurations of first and second examples, respectively, of a composite carbon plate according to the present invention.
Figure 4:
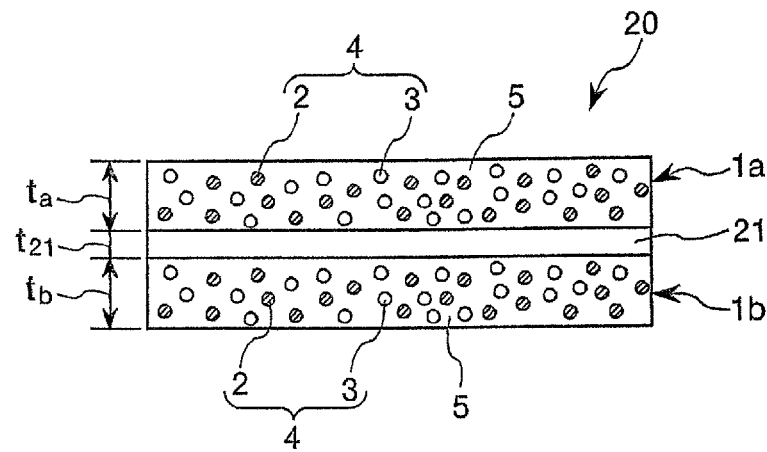

Next, a composite carbon plate according to the present invention will be described. FIGS. 4(*a*) and 4(*b*) show an entire configurations of first and second examples of a composite carbon plate 20 according to the present invention.

In the first embodiment shown in FIG. 4(*a*), the composite carbon plate 20 according to the present invention is composed of the thin-plate-like carbon plate 1 made of graphite described in the above first embodiment, and a metal plate 21 having the carbon plate 1 joined integrally to one face. In the second example shown in FIG. 4(*b*), the composite carbon plate 20 according to the present invention is configured such that the metal plate 21 is held between the thin-plate-like carbon plates 1 (1*a*, 1*b*) made of graphite described in the above first embodiment, that is, the carbon plates 1 (1*a*, 1*b*) are joined integrally to both faces of the metal plate 21.

That is, the composite carbon plate 20 according to the present invention is configured such that the carbon plate 1 described in the first embodiment is integrally joined to at least one face of the metal plate 21.

It is preferred that the metal plate 21 be made from stainless steel, steel, aluminum, aluminum alloy, copper, copper alloy, nickel, nickel alloy, or the like. Further, the thickness (t21) of the metal plate 21 is 10 to 150 μm. If the plate thickness of the metal plate 21 is less than 10 μm, an increase in mechanical strength cannot be expected, but, if the plate thickness exceeds 150 μm, a problem with flexibility arises. Further, in a case of the composite carbon plate 20 configured to have the carbon plates 1 (1*a*, 1*b*) disposed on both faces of the metal plate 21, as shown in FIG. 4(*b*), thicknesses to and tb of the respective carbon plates, that is, the top carbon plate 1a and the bottom carbon plate 1b, are within a range of 0.05 to 2.0 mm, but the respective thicknesses ta and tb of the top carbon plate 1a and the bottom carbon plate 1b may be the same thickness, or may also be different thicknesses.

(Method of Manufacturing Composite Carbon plate)

Next, a method of manufacturing the composite carbon plate 20 of the present invention will be described.

Specific Example 2-1

The composite carbon plate 20 of the present invention, according to an example, can be manufactured by using the carbon plate 1 after resin hardening that is produced by thermal compression molding or cold compression molding described in the specific examples 1-1 and 1-2 of the above first embodiment, for example.

Figure 5:
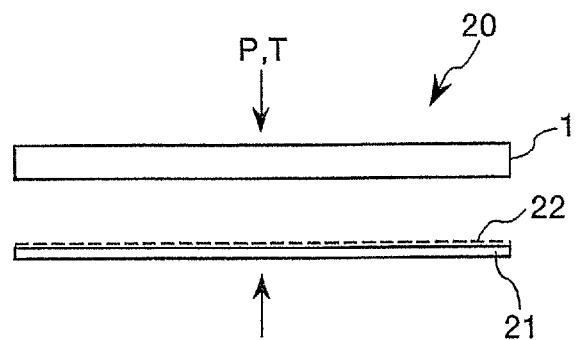
FIGS. 5(a) and 5(b) are schematic diagrams explaining examples of a method of manufacturing a composite carbon plate according to the present invention.
Figure 5:
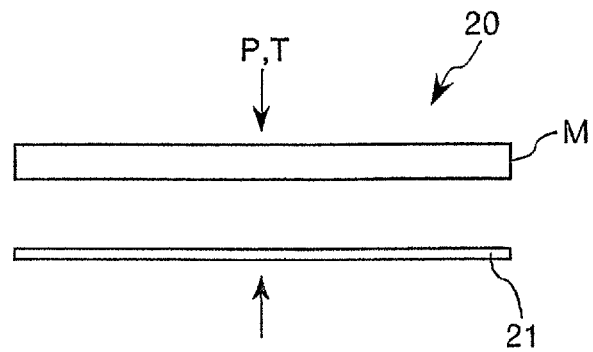

That is, as shown in FIG. 5(a), the carbon plate 1 after resin hardening that was produced in the same manner described in the specific examples 1-1 and 1-2, and the metal plate 21 are pressed against each other via an adhesive 22, and heated and pressurized into one. The adhesive 22, in the example shown in FIG. 5(a), is applied on one face of the metal plate 21, but, of course, the adhesive 22 can also be applied on a face of the carbon plate 1, instead of being applied on the metal plate 21, or the adhesive 22 can also be applied on both members of the carbon plate 1 and the metal plate 21.

The adhesive 22 can be thermosetting resin, for example, the phenolic resin used for the carbon plate 1, or either furan resin or epoxy resin, or composite resin thereof. A layer thickness of the adhesive 22 is about 1 to 5 Further, a temperature T when the carbon plate 1 and the metal plate 21 are heated and pressurized is 130 to 200° C., and a pressurizing force P is 1 to 10 MPa (typically, about 3 MPa).

According to the above manufacturing method, the composite carbon plate 20 having a configuration shown in FIG. 4(a) where the carbon plate 1 is disposed on one face of the metal plate 21 is produced, but, by disposing the carbon plates 1 (1a, 1b) on both faces of the metal plate 21 and joining them integrally, the composite carbon plate 20 having a configuration shown in FIG. 4(b), that is, a configuration where the metal plate 21 is held between the carbon plates 1 (1a, 1b), is manufactured.

Specific Example 2-2

The composite carbon plate 20 of the present invention can be manufactured by using the molded plate M before resin hardening that is obtained by cold compression molding in the specific example 1-2 of the above first embodiment, for example.

In this case, as shown in FIG. 5(b), the carbon plate before resin hardening, that is, the molded plate M and the metal plate 21 are heated and pressurized into one at a predetermined temperature T with a pressurizing force P without using an adhesive. By this heating pressurizing process, the molded plate M is hardened to form the carbon plate 1, and the metal plate 21 is joined integrally to the carbon plate 1, and the composite carbon plate 20 is thus produced. It should be noted that the temperature when the carbon plate 1 and the metal plate 21 are heated and pressurized is 130 to 200° C., and the pressurizing force P is 1 to 10 MPa (typically, about 3 MPa).

By the above manufacturing method, the composite carbon plate 20 having the configuration shown in FIG. 4(a) where the metal plate 21 is disposed on one face of the carbon plate 1 is produced, but by disposing the molded plates M on both faces of the metal plate 21, the composite carbon plate 20 having a configuration shown in FIG. 4(b) is produced.

Specific Example 2-3

Figure 6:
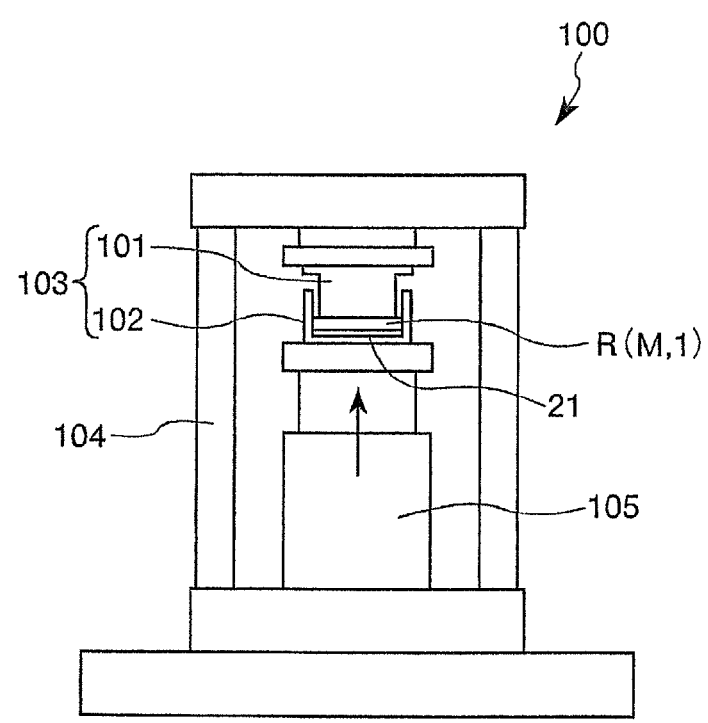
FIG. 6 is a schematic diagram showing a configuration of a press device used in a thermal compression molding process or a cold compression molding process, which is similar to FIG. 2(a), for manufacturing a composite carbon plate according to the present invention.
Figure 7:
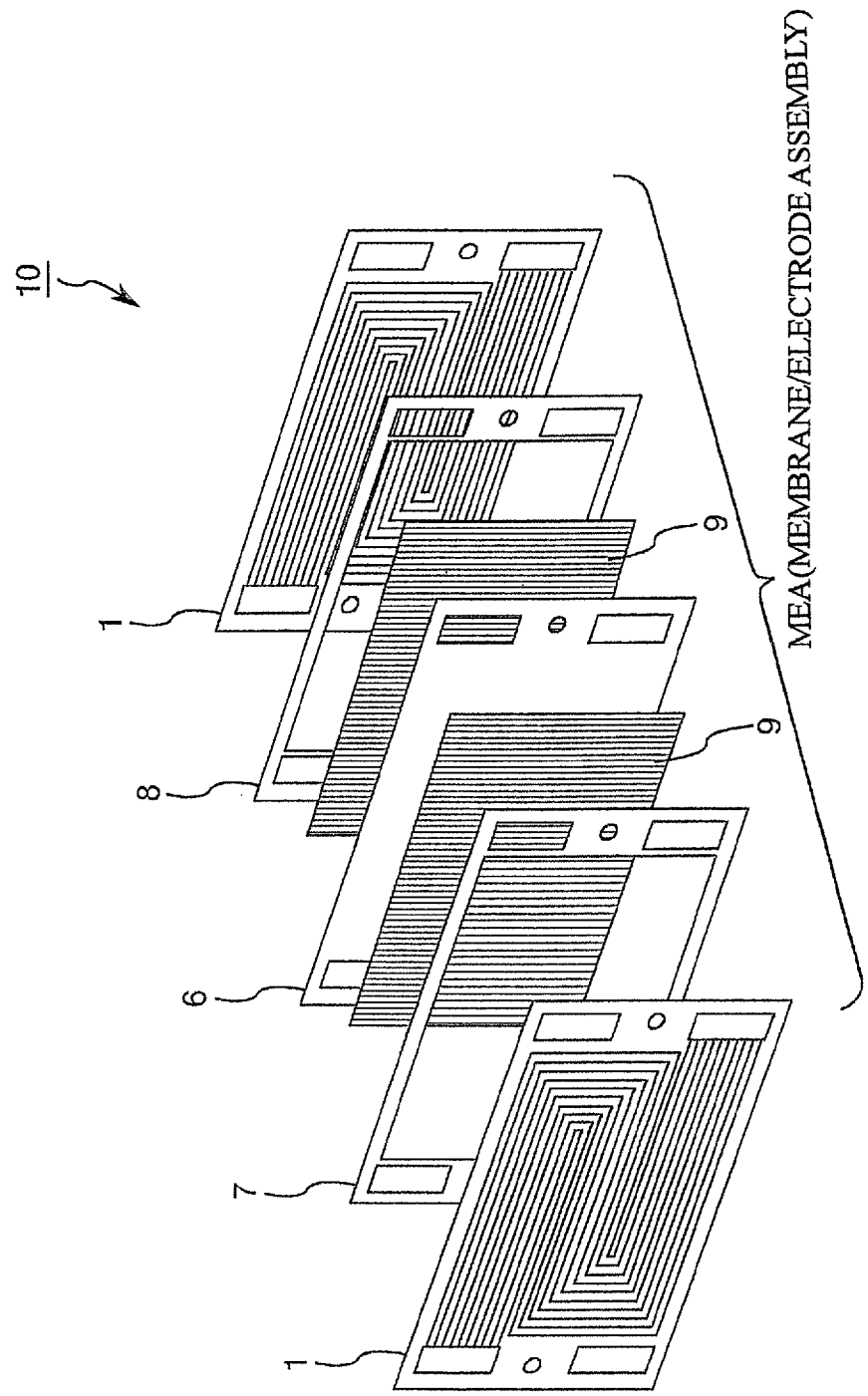
FIG. 7 is an exploded diagram showing a configuration of a unit cell constituting a fuel cell.

Further, as shown in FIG. 6, the composite carbon plate 20 according to the present invention can be produced in a single process by using the thermal compression molding method described in the specific example 1-1 of the above first embodiment.

That is, a uniaxial thermal compression molding device having the same configuration as described in the specific example 1-1 of the above first embodiment is used as the press device 100, and, first, the metal plate 21 is placed in the female mold 102 of this press device 100. Then, the raw mixture R prepared in such a blending ratio as described in the first embodiment is put into the female mold 102 and molded by thermal compression in the press device 100 so that the resin is hardened. In this manner, the composite carbon plate 20 having the metal plate 21 integrally joined to one face of the carbon plate 1 having a thickness after molding of 0.05 to 2.0 mm can be obtained.

It should be noted that thermal compression molding conditions may be the same conditions as described in the specific example 1-1. That is, the heating temperature is 130 to 200° C. that is equal to or higher than a curing temperature of the phenolic resin 5, and the molding pressure is 3 to 30 MPa, and the molding time is 3 to 30 minutes. A vacuum press may be used.

By the above manufacturing method, the composite carbon plate 20 having a configuration shown in FIG. 4(a) where the carbon plate 1 is disposed on one face of the metal plate 21 is produced.

Specific Example 2-4

The molded material M having the metal plate 21 integrally joined can be produced by using the cold compression molding method described in the specific Example 2-2 of the above first embodiment. Thereafter, the molded material M is hardened, and the composite carbon plate 20 according to the present invention can be thus produced.

That is, a uniaxial compression molding device having a configuration similar to the configuration shown in FIG. 6 but being not equipped with a heater is used as the press device 100. In the press device 100 having such a configuration, first, the metal plate 21 is placed in the female mold 102. Next, the raw mixture R prepared in such a blending ratio as described in the first embodiment is put into the female mold 102 and molded by cold compression. In this manner, the molded plate M before resin hardening having the metal plate 21 integrally joined to one side is obtained.

Next, the molded plate M having the metal plate 21 integrally joined is heated in the heating device 200, such as a furnace (oven), shown in FIG. 2(b), so that the resin of the molded plate M is hardened, and the composite carbon plate 20 having the metal plate 21 integrated is thus manufactured.

By the above manufacturing method, the composite carbon plate 20 having the configuration shown in FIG. 4(a) where the carbon plate 1 is disposed on one face of the metal plate 21 is produced.

Experimental Example

Next, in order to demonstrate the performance of the composite carbon plate 20 of the present invention, an experimental example of the present invention will be described.

It should be noted that, in experimental examples 8 to 12 of the present invention, various carbon plates of 0.05 mm or 0.30 mm in thickness, 300 mm in length×200 mm in width were manufactured as the carbon plate 1 configured according to the present invention described in the above first embodiment, and a molded sample S was manufactured by joining this carbon plate 1 integrally to one face or both faces of the metal plate 21. The experimental example 8 is the composite carbon plate 20 having the carbon plate 1 joined to one face of the metal plate 21, and the experimental examples 9 to 12 are the composite carbon plates 20 having the carbon plates 1 (the top carbon plate 1a, the bottom carbon plate 1b) integrally joined to both faces of the metal plate 21. Further, experimental examples 13 and 14 are the carbon plates 1 having the configuration according to the present invention described in the above first embodiment where the metal plate 21 is not joined.

It should be noted that, the molded samples S in the experimental examples 8 to 12 were produced by joining the metal plate 21 integrally to the molded material M manufactured based on the same cold compression molding method as described in the above specific example 2-2, and thereafter hardening the resin. In the experimental examples 13 and 14, the molded material M was produced based on the same cold compression molding method as described in the above specific example 2-2, in the same manner as the molded sample in the experimental examples 8 to 12, but hardening was performed without joining the metal plate 21.

Regarding each experimental example, compressive strength, bending strength (bending strain) (1), (2), electrical resistance (contact resistance, maximum value of ten-point contact resistances), and gas impermeability and tensile strength were measured and compared. The same methods of measuring compressive strength, bending strain, and contact resistance (maximum value of ten-point contact resistances) as described in the experimental examples and comparative examples of the first embodiment were adopted.

Gas impermeability was determined from hydrogen permeability (mol/m$^2$sPa). Hydrogen permeability was measured according to a method A (differential-pressure method) of JIS K7126 under the conditions: sample moisture control: 23° C., 50% RH 48 or more hours; measurement temperature: 23° C.; and gas type used: hydrogen gas.

As a method of measuring a tensile strength, a tensile testing method based on JIS Z 2241 was adopted. JIS No. 13 B tensile test piece of JIS Z 2201 was used as a tensile test piece.

Tables 2(a) and 2(b) show blending ratios of raw powder used in the respective experimental examples, measurement results, and acceptance and rejection judgment results, and the like.

It should be noted that the same raw powder and phenolic resin as described in the experimental examples and comparative examples in the above first embodiment were used. That is:

In the experimental examples 8 to 12 and the experimental examples 13 and 14, the expanded graphite powder 2 and the graphite powder 3 were used as the carbon powder 4. Graphite powder having an average particle size of 20 μm and a particle aspect ratio of 1.5 was used as the graphite powder 3. Phenolic resin that did not contain ammonia was used as the phenolic resin 5 in a state of coating the graphite powder 3. The carbon powder 4 and the phenolic resin 5 were sufficiently mixed into a raw mixture (mixture powder) in different mixing ratios (wt %), as shown in Table 2(a). The mixture powder was evenly put into the female mold 102 having a volume of 300×200×20 mm of the press device 100 by a predetermined amount (0.05 mm carbon plate thickness: 4.5 g, 0.30 mm: 27.0 g), and molded by cold compression, and the molded material M was thus obtained. Thereafter, in the experimental examples 8 to 12, the composite carbon plate 20 was produced by pressing the molded material M and the metal plate 21 one on top of the other with a heating temperature of 150° C., a pressure of 5 MPa, and a molding time of 10 minutes. Regarding the molded samples S in the experimental examples 13 and 14, the carbon plates 1 were produced from the molded material M obtained by cold compression molding with a heating temperature of 150° C. and a time of 10 minutes.

In Table 2(a), regarding the metal plate 21, a stainless steel used is SUS304, the stainless steel (1) is an annealed material having a tensile strength of 600 MPa, and the stainless steel (2) is a hard material having a tensile strength of 1200 MPa. Further, the copper is a ½ H material of tough pitch copper (C1100), and the steel is SPCC.

The compressive strength, bending strength (bending strain) (1), (2), electrical resistance (contact resistance, maximum value of ten-point contact resistances), and gas impermeability and tensile strength were as shown in Table 2(b).

TABLE 2(a)

| | | Graphite amount (wt %) | | | Phenolic resin amount wt % | Phenolic resin type Presence/ absence of ammonia | Resin blending method | Kind of metal | Top carbon plate thickness mm | Thickness of metal mm | Bottom carbon plate thickness mm |
|---|---|---|---|---|---|---|---|---|---|---|---|
| | | Expanded graphite | Graphite | Total | | | | | | | |
| 8 | Experimental | 30 | 70 | 100 | 9 | Not contained | Coating graphite | Stainless steel (1) | 0.30 | 0.10 | None |
| 9 | example | 30 | 70 | 100 | 9 | Not contained | Coating graphite | Stainless steel (1) | 0.30 | 0.10 | 0.05 |
| 10 | | 30 | 70 | 100 | 5 | Not contained | Coating graphite | Stainless steel (2) | 0.30 | 0.05 | 0.05 |
| 11 | | 30 | 70 | 100 | 9 | Not contained | Coating graphite | Copper | 0.30 | 0.10 | 0.05 |
| 12 | | 30 | 70 | 100 | 9 | Not contained | Coating graphite | Steel | 0.30 | 0.10 | 0.05 |
| 13 | | 30 | 70 | 100 | 9 | Not contained | Coating graphite | None | 0.30 | None | None |
| 14 | | 30 | 70 | 100 | 5 | Not contained | Coating graphite | None | 0.30 | None | None |

TABLE 2(b)

| | | Compressive strength (MPa) | | | Bending strength (1) 0.67% strain | Bending strength (2) 0.67% strain | Contact resistance mΩ·cm² | Maximum value of ten-point contact resistances mΩ·cm² | Tensile strength MPa | Hydrogen permeability mol/m²sPa |
|---|---|---|---|---|---|---|---|---|---|---|
| | | 3 | 5 | 10 | | | | | | |
| 8 | Experimental | ○ | ○ | ○ | ○ | ○ | 4.8 | 5.2 | 195 | $1.0 \times 10^{-14}$ or less |
| 9 | example | ○ | ○ | ○ | ○ | ○ | 4.5 | 4.6 | 180 | $1.0 \times 10^{-14}$ or less |
| 10 | | ○ | ○ | ○ | ○ | ○ | 5.0 | 5.2 | 172 | $1.0 \times 10^{-14}$ or less |
| 11 | | ○ | ○ | ○ | ○ | ○ | 4.8 | 4.8 | 108 | $1.0 \times 10^{-14}$ or less |
| 12 | | ○ | ○ | ○ | ○ | ○ | 4.7 | 5.1 | 145 | $1.0 \times 10^{-14}$ or less |
| 13 | | ○ | ○ | ○ | ○ | ○ | 5.0 | 5.2 | 62 | $6.0 \times 10^{-9}$ |
| 14 | | ○ | ○ | ○ | ○ | ○ | 5.0 | 5.3 | 48 | $1.0 \times 10^{-8}$ |

(Compressive strength);
○: a case where an impression did not remain;
X: a case where an impression remained
(Bending strength (1));
○: a case where 0.67% strain did not cause a crack;
X: a case where 0.67% strain caused a crack
(Bending strength (2));
after immersion in 90° C. hot water for 100 hours;
○: a case where 0.67% strain did not cause a crack;
X: a case where 0.67% strain caused a crack From Tables 2(a), 2(b), it can be seen that, regarding the compressive strength, bending strength (bending strain), and electrical resistance (contact resistance, maximum value of ten-point contact resistances), the composite carbon plates 20 according to the present invention shown in the experimental examples 8 to 12 have performance equivalent to the carbon plates 1 configured according to the present invention described in the above first embodiment shown in the experimental examples 13 and 14, and that, regarding the gas impermeability and tensile strength, the composite carbon plate 20 according to the present invention has much better performance than the carbon plate 1 configured according to the present invention described in the above first embodiment shown in the experimental examples 13, 14.

DESCRIPTION OF REFERENCE NUMERALS

1 Separator for fuel cell (carbon plate)
2 Expanded graphite powder
3 Graphite powder
4 Carbon powder
5 Phenolic resin
20 Composite carbon plate
21 Metal plate
22 Adhesive

The invention claimed is:

1. A carbon plate having a thickness of 0.05 to 2.0 mm obtained by compression molding of a mixture of:
  (a) 97 to 80 wt % carbon powder composed of 95 to 30 wt % expanded graphite powder and 5 to 70 wt % graphite powder; and
  (b) 3 to 20 wt % phenolic resin not containing ammonia, wherein a compressive strength is 3 MPa or more, a bending strain is 0.6% or more without a crack, and a contact resistance is 6 mΩ·cm² or less.

2. The carbon plate according to claim 1, wherein a maximum value of ten-point contact resistances is 6 mΩ·cm² or less.

3. The carbon plate according to claim 2, wherein the graphite powder is coated with the phenolic resin.

4. A composite carbon plate having a carbon plate integrally joined to at least one side of a metal plate having a thickness of 10 to 150 μm, wherein the carbon plate is a carbon plate according to claim 2.

5. The composite carbon plate according to claim 4, wherein the metal plate is stainless steel.

6. The carbon plate according to claim 1, wherein the graphite powder is coated with the phenolic resin.

7. A composite carbon plate having a carbon plate integrally joined to at least one side of a metal plate having a thickness of 10 to 150 μm, wherein the carbon plate is a carbon plate according claim 6.

8. The composite carbon plate according to claim 7, wherein the metal plate is stainless steel.

9. A composite carbon plate having a carbon plate integrally joined to at least one side of a metal plate having a thickness of 10 to 150 μm, wherein the carbon plate is a carbon plate according to claim 1.

10. The composite carbon plate according to claim 9, wherein the metal plate is stainless steel.

* * * * *